Dec. 13, 1966  L. J. SCHNEIDER ETAL  3,290,895
APPARATUS FOR MAKING FLAKE ICE

Filed Feb. 18, 1959  4 Sheets-Sheet 1

INVENTORS:
LOUIS J. SCHNEIDER
RUSSELL F. HACKMAN
BY
Kegan, Bellamy & Kegan
ATTORNEYS Dec. 13, 1966 L. J. SCHNEIDER ETAL 3,290,895
APPARATUS FOR MAKING FLAKE ICE
Filed Feb. 18, 1959 4 Sheets-Sheet 4

INVENTORS:
LOUIS J. SCHNEIDER
RUSSELL F. HACKMAN
BY
Kegan, Bellamy & Kegan
ATTORNEYS

United States Patent Office 3,290,895
Patented Dec. 13, 1966

3,290,895
APPARATUS FOR MAKING FLAKE ICE
Louis J. Schneider and Russell F. Hackman, Chicago, Ill., assignors to Ross-Temp, Inc., Chicago, Ill., a corporation of Illinois
Filed Feb. 18, 1959, Ser. No. 794,010
16 Claims. (Cl. 62—298)

This invention relates to apparatus for making flake or chip ice as a continuous process. Its principal object is to provide an economical and commercial form of the apparatus, with additional general objects being to provide the apparatus in readily serviceable form to meet encountered commercial conditions, as well as to meet all reasonable sanitary requirements concerning ice produced for use in direct-contact cooling of drinks and food products generally.

Heretofore, it has been proposed to produce chipped or flaked ice in an upstanding cylindrical vessel kept continuously supplied with water and containing an upstanding cylindrical freezer tube surrounded by the water in the vessel to continuously produce sheet-like ice around the freezer tube, with a continuously rotating spiral auger surrounding the freezer tube to continuously chip or flake off the ice as it is formed on the freezer tube and convey it upwardly through the surrounding water to a point of lateral discharge from the vessel above the water level. Several difficulties have arisen in production of ice with the noted proposed apparatus. The relatively great stresses required for flaking the formed ice loose from the freezer tube have caused the auger to move sideward into contact with the freezer tube and shortly produce excessive wear of the parts with a resultant lowering of the mechanical efficiency, as by rendering the ice harder to free from the freezer tube; the mechanical stresses have been such that, particularly during operations in relatively cold surroundings, the intermittent elongation of the auger has either caused the end of the auger to wear excessively against the bottom of the vessel or has caused the auger to undergo violent return movement following elongation and responsive to the freeing of ice along the freezer tube, such returning movement often being sufficiently violent as to give rise to sharp loud noises and to shorten the life of the apparatus; the loosened ice has sometimes jammed within the containing vessel rather than being ejected as intended, causing the entire vessel to shortly freeze solid and stop further movement of the auger; the practical necessity of driving the auger from above the vessel through a motor and a reducing gear box, both located above the point of discharge of the ice, has greatly lowered the capacity of a storage bin included in the apparatus to store ice, without increasing the height of the containing cabinet unduly, and the flaked or chipped ice as discharged has contained more adherent water than is desirable; difficulty has been encountered in cleaning and sterilizing the ice-making vessel and included parts as heretofore constructed; and apparatus failures which cannot be repaired locally at the point of use have resulted in the user having to send the entire apparatus to a repair station, which is both expensive and time-consuming, leaving the user without a source of ice for some time.

According to the invention the foregoing and other difficulties not specifically enumerated have been overcome as follows:

(1) The auger has been made more rigid and more economical by producing it as a spiral of round steel rod of large diameter, securely welded at the top of the outer end of a heavy horizontal auger arm, keyed to and laterally located by the downwardly extending drive shaft and supported centrally on the freezer tube by a bearing insert of low-friction plastic material, such as nylon.

(2) The efficiency of the auger in carrying loosened ice upwardly to the ejection point has been greatly improved by providing the containing vessel with one or more vertical ribs on which ice attempting to turn idly with the auger without raising is caught and forced to move upwardly as the auger turns.

(3) The tendency of the unattached lower end of the auger to move laterally under stress into contact with either the freezer tube or the inside wall of the containing vessel is precluded by low-friction guide means for the lower end of the auger, which preferably take the form of a sleeve of low-friction plastic (such as nylon) surrounding the lower end of the auger and laterally supported by the inside wall of the vessel, the sleeve substantially contacting the outside of the auger and holding it in firm guided alignment. In an alternative construction, the lower end of the auger is closely guided by a guide ring attached thereto surrounding the freezer tube and carrying an inserted ring of low-friction material in substantial contact with the outside wall of the freezer tube.

(4) Any slight tendency of the very stiff round-rod auger to elongate unduly under great stress, as when very hard ice is being produced under low ambient temperature conditions, is nullified by providing a low-friction end-thrust bearing between the lower end of the auger and the bottom of the vessel, taking the form of a washer-like ring supported on the bottom of the vessel in the preferred embodiment, and taking the form of a button insert in the lower part of the auger in an alternative form. The arrangement in both forms is such as to provide only a very small clearance with the thrust being taken up by the bottom of the vessel whenever the auger attempts to elongate more than the small clearance provided.

(5) The discharged ice is rendered much drier, and the level of fill attainable in the storage bin is considerably raised by carrying the ejected ice up an inclined chute to the storage bin. During the travel of the ice up this chute, any excess water adherent to and between the flakes or chips is permitted to drain back into the vessel. A subordinate feature concerns the auger arm which is tapered rearwardly and outwardly on the leading side of the outer end to provide a sufficient thrust to the ejected ice to force it to travel up the inclined chute. This forcing action is further enhanced by locating one of the noted internal vertical ribs of the vessel along the trailing edge of the discharge opening.

(6) In the cabinet form of the apparatus, the entire refrigerating and ice-making equipment (including a motor-driven compressor and condenser and said ice-making vessel and its drive motor and gear box) is mounted on a field-replaceable chassis to permit servicing of the ice-maker apparatus by the installation of a replaceable chassis from a nearby point of distribution.

(7) The sanitary requirements of cleaning and sterilizing all of the parts for making and storing the ice are met primarily by arranging that the assembly of motor and gear box with the auger, vessel, and freezer is easily dismounted and taken apart by removing the motor and gear box from the vessel and from the auger, removing the sidewall of the vessel from the bottom thereof, and removing the auger from around the freezer tube. This disassembly is performed in the preferred embodiment by merely removing two clamping wing nuts. The storage compartment within the cabinet is readily cleaned by opening the service door thereof, a drain being provided at the bottom, and the float-valve controlled storage tank for the water supplied to the freezing vessel is located in the storage compartment for easy cleaning access.

The above-mentioned and other objects and features of this invention, and the manner of obtaining them will become more apparent, and the invention will be best understood by reference to the following description of the invention taken in conjunction with the accompanying drawings comprising FIGS. 1 to 15, wherein.

Referring first to FIGS. 1 to 5, the ice-making structure is contained within cabinet 1, which has an ice storage compartment 30 into which the produced ice is delivered through the upwardly inclined chute 21.

As viewed externally, cabinet 1 is enclosed by a top panel 2, left and right end panels 3 and 4, front panel 5, access door 6 with its handle 7, and rear panel 8. The cabinet is supported on a bottom panel or structure 9, supported in turn by left and right rearwardly elongated feet 11 and 12. Right panel 4 has devices mounted therein, comprising on-off switch 15 for the internal electrical apparatus, and start or reset button 16. Also extending outwardly from the rear face of panel 4 is the end of supply tube 25, to which a source of potable water under pressure may be connected, as by a rubber tube (not shown). Drain tube 32 extends rearwardly alongside the rear face of panel 4, through a slot in rear panel 8 (being the drain tube for drain 31 of storage bin 30), and is connectable, as by a rubber tube (not shown), to a suitable waste line. The rearwardly extending portion of tube 32 is anchored by being carried through an opening in bracket 57 (FIG. 5), secured to the back wall of storage bin 30 by screws 58.

Figure 5:
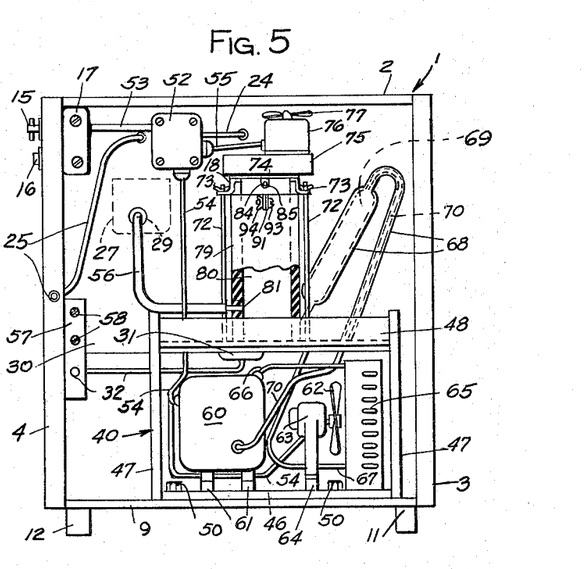
FIG. 5 is a rear view of the structure of FIGS. 1 to 4 with the back panel 8 removed.

Commercial electric power is supplied to the apparatus within cabinet 1 through junction box 17, which has its base attached to the rear portion of panel 4 just within the confines of the cabinet, and extends outwardly through a corner notch in rear panel 8 to permit the usual and approved electrical connections to be made. As seen best in FIG. 5, showing a rear view of cabinet 1 with rear panel 8 removed, the internal electric wiring may include conductors in cable or conduit 53, distribution and control box 52 which includes such relays and/or other control apparatus as may be required, plug-detachable supply cord 55 for auger-drive motor 76, and plug-detachable cord conductors 54 through which the usual electric motor of motor-compressor 60 and condenser-fan motor 63 are supplied. Also extending out of control box 52 is a thermostat tube 24 which extends to and terminates in a bracket-supported portion 24 within storage bin 30. Preferably, tube 24 is connected to well-known control apparatus within box 52 which acts to shut down the ice-making apparatus when the ice level within storage bin 30 reaches thermostat tube 24 and cools it. Eessentially, this comprises disconnecting power from the motor of motor-compressor 60, and may also include disconnection of power from motors 63 and 76.

Contained within storage bin 30 is a small water tank or reservoir 27, which contains float valve 26 actuated by float 28 (FIG. 3) to maintain the water supplied through tube 25 to a desired level within tank 27, determinative of the level (indicated at WL in FIGS. 7 and 11) at which the water is to be maintained within the ice-making vessel or chamber. The outlet for the water stored within tank 27 is through a tube 29 (FIGS 4 and 5), extending through the rear wall of bin 30 and connected by tube or rubber hose 56 to inlet tube 81 of the upright tube 80 which comprises the defining sidewall of the ice-making vessel.

When storage bin 30 is to be cleaned, any ice therein may be removed to permit the bin to be washed and sterilized as desired, and the cover (not shown) for reservoir 27 may be removed to permit the reservoir to be cleaned as desired, the reservoir being located within the storage bin in about the position shown to facilitate easy access thereto and cleaning thereof.

When the apparatus of FIGS. 1 to 5 is in operation, motor compressor 60 and auger motor 76 are in continuous operation, with local cooling fan 77 being rotated to maintain 76 relatively cool. Condenser fan 62 is driven by its motor 63, either continuously or intermittently depending upon the control arrangement employed. When intermittently operated, it is thermostatically controlled to operate only when condenser 65 becomes heated to a predetermined temperature, for example. Air blown through condenser 65 (of usual construction) passes to the outside through removable vent 14 in end panel 4, intake air being provided through vent 13 in front panel 5 and through a vent (not shown) similar to 14 in end panel 3.

Also, when the apparatus of FIGS. 1 to 5 is in operation, ice is being delivered continuously up chute 21 to drop into storage bin 30, the dropping ice particles being caused to spread in two directions by spreader 22 (FIGS. 3, 7, and 9) to lessen the tendency of the discharged ice to pile up just underneath chute 21, by causing the ice to be spread more toward the ends of the storage bin. The spreading tendency is to the right or to the left depending upon which of the two inclined sides of spreader 22 is encountered by any given portion of the discharged ice particles.

The high-pressure gaseous refrigerant is delivered from motor compressor 60 through conduit 66 to the top of condenser 65, wherein the usual liquification of the high-pressure gas is accomplished. High-pressure liquid refrigerant is delivered from the bottom of condenser 65 through tube 67 to the evaporating chamber within the freezer tube contained in vessel 80. At least a portion of the tube or conduit 67 may be the usual capillary tube to maintain compression substantially until the evaporating chamber is reached.

The low-pressure return line from the evaporating chamber to the intake of motor compressor 60 is shown at 70. A substantial portion of the return line is insulated at 68 to minimize the formation of dew or frost on the chilled portion of 70. Return line 70 includes the indicated enlarged or bulb portion within the enlarged portion of insulating cover 68, being the enlarged bulb portion customarily employed in the return line of refrigerating apparatus.

As an aid in fabrication, assembly, and testing during manufacture, and as an aid in servicing and repair, the primary components of the refrigerating and ice-making apparatus are mounted on a chassis 40 (FIGS. 5 and 6) supported on the base 46, which may be secured to the bottom panel or structure 9 of the cabinet 1 as by bolts having the illustrated bolt heads 50. The chassis is seen in rear view in FIG. 5 and in right-end view in FIG. 4. The apparatus items directly supported on base 46 of the chassis include the motor-compressor 60, the condenser fan 62, 63, and the condenser 65. Item 60 may be suspended on the usual cushion feet 61, with item 62, 63 being cushioned at 64. The other apparatus on the chassis 40, comprising the actual ice-making apparatus, is mounted on an elevated platform support 48, supported from base 46 by two upright angle members 47, as in the usual welded steel construction. The uprights 47 are each braced by a brace rod 49, one of which is shown in the end view of chassis 40 in FIG. 4. In that view, certain components shown elsewhere are omitted for clarity. For example, motor compressor 60 and condenser fan 62, 63 are removed in FIG. 4 to give a full view of condenser 65. The bent or angled construction of braces 49 is such that the horizontal portion of each such brace (one at each end of the chassis) provides convenient carrying and lifting handles for the chassis 40.

It will be observed that the width of base 46 of chassis 40 (as viewed from the end in FIG. 4) is considerably greater than the width of elevated platform 48 when similarly viewed. This arrangement is coordinated with the arrangement of storage bin 30 in the cabinet 1 and permits relatively wide items such as motor compressor 60, fan 62, and condenser 65 to lie partly under storage bin 30 and partly under the elevated platform structure 48 as a matter of space utilization. On the other hand, the structure mounted on platform 48 is of smaller lateral dimensions and is readily contained in the portion of the cabinet lying directly behind the storage bin.

When any part of the apparatus mounted on chassis 40 needs to be serviced or replaced, the chassis may be freed from the cabinet 1 by removing bolts 50, slipping flexible tube 56 off water-supply nipple 81, and removing the plugs in which cables or cords 54 and 55 terminate. The entire chassis 40 may then be slid out of the back of cabinet 1 (with back panel 8 removed) and may be lifted or carried as desired by using the horizontal portion of brace rods 49 at the ends of the chassis. In practice, a replacement chassis is ordinarily provided with all parts complete except for the assembly comprising motor 76 and reducing gear box 75 and without the noted auger hereinafter described, as these items are separately detachable as hereinafter described incident to the cleaning operation and thus need not be furnished as an integral part of the chassis-mounted apparatus unless specifically requested by the user.

Figure 1:
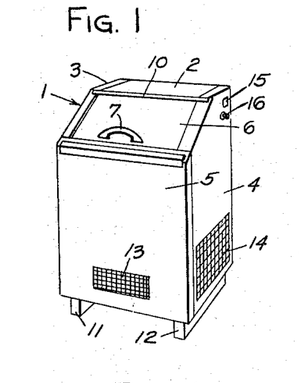
FIGS. 1 and 2 are respectively front-side and rear-side diagonal views of an ice-making cabinet form of apparatus according to the invention.
Figure 2:
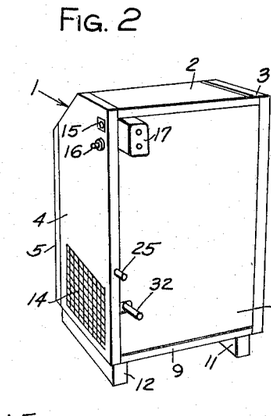
Figure 3:
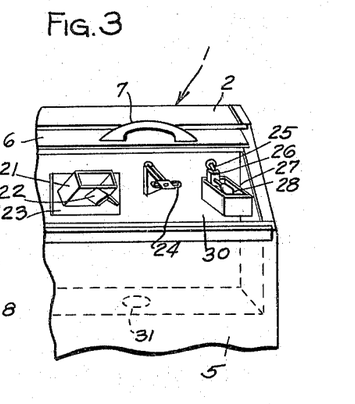
FIG. 3 is a partial diagonal front view of the structure of FIGS. 1 and 2 with the access door open to show the storage bin.
Figure 4:
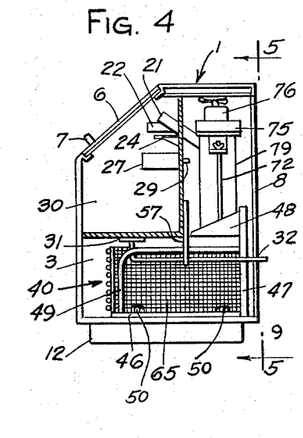
FIG. 4 is a right-end view of the structure of FIGS. 1 to 3 with the right end panel 4 removed.

Referring to FIGS. 6 to 11 in combination with FIGS. 4 and 5, the ice-making apparatus includes a generally cylindrical base block 100 supported on the upper surface of platform 48 of chassis 40 and held in place as by screws 101. Base 100 includes a reduced upwardly extending portion 106, above shoulder 107, sized to be received closely in hollow cylinder 80 which defines the sidewall of the ice-making vessel and which contains water up to a water level as indicated by WL and determined as previously noted by the adjustment of the float within reservoir 28 of FIG. 3. Cylinder 80 is detachable from base 100 upon being freed to be lifted upwardly therefrom, and a sealing connection is made between 80 and 106 by a flexible sealing ring 110 contained in groove 109. Base 100, the upper face of which comprises the bottom of the cylindrical ice-making vessel, is concentrically surmounted by a freezer tube or evaporator 130 which is shown in cross-sectional view in FIG. 11. The evaporator tube is permanently fixed in its indicated position as by brazing or welding and is permanently closed at the top by cap member 132 which includes reduced portion 133 received within tube 130.

Base 100 includes slots 102 and 103 for stub inlet and outlet tubes 104 and 105, which are sealed respectively with the high-pressure and low-pressure tubes 63 and 70 of FIG. 5 in the usual manner. It will be observed that inlet stub 104 terminates near the bottom of the evaporating chamber enclosed by tube 130, while the return stub 105 terminates near the top as is usual in refrigerating apparatus to minimize the tendency of unevaporated liquid refrigerant to enter the return line under certain conditions of operation.

Figures 6, 7, 8, 9:
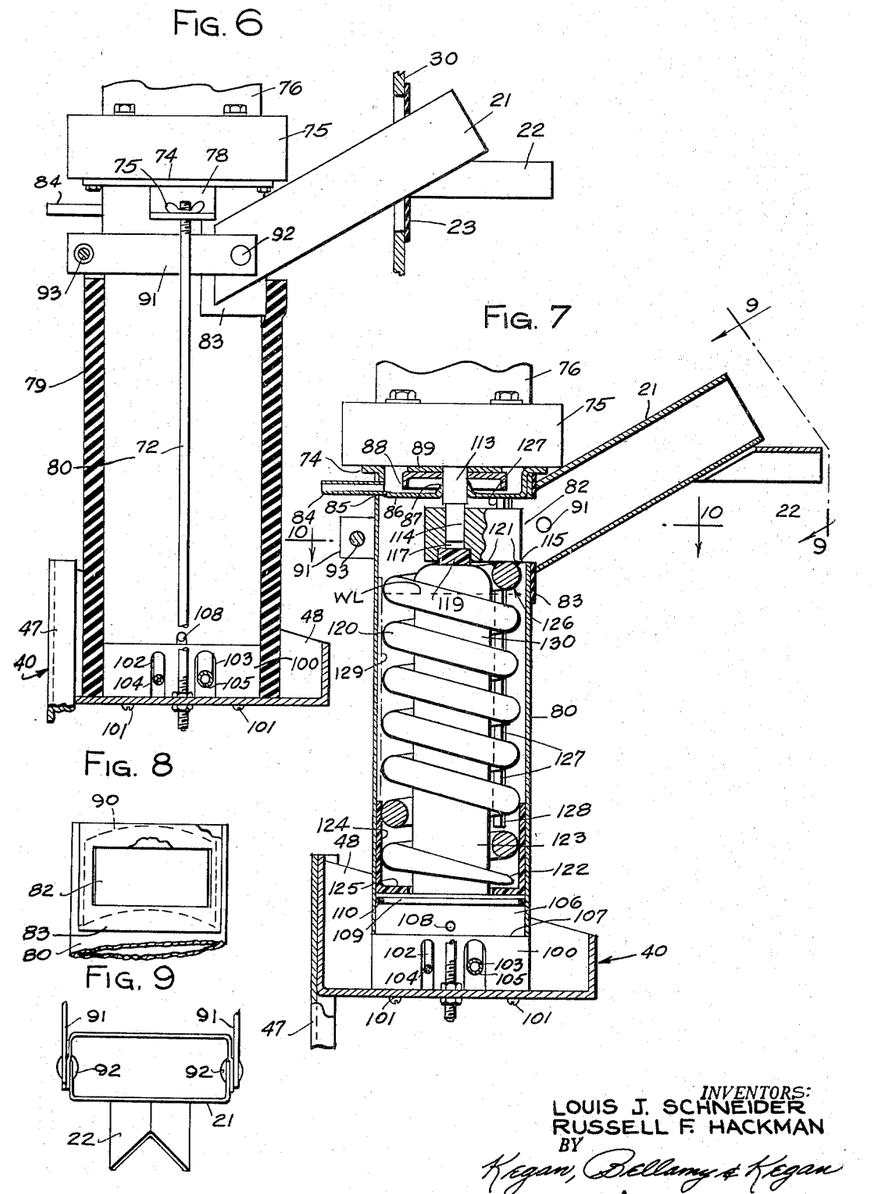
FIGS. 6 and 7 are right-side views of a portion of the apparatus shown in FIGS. 4 and 5.
FIG. 8 is a fragmentary front view of vessel tube 80 of FIGS. 6 and 7, showing the discharge opening therein for the produced ice.
FIG. 9 is an end view of the inclined discharge chute, along 9—9 of FIG. 7.

As shown best in FIG. 7, evaporator tube 130 is closely surrounded (perhaps ³⁄₆₄ inch clearance on a side) by spiral auger 120, formed from round rod preferably of a suitable grade of high-strength steel of spring hardness to permit it to elongate somewhat under stress without likelihood of breakage in normal intended use. As indicated, auger 120 has a left-hand spiral and is operated in a left-hand or counterclockwise direction, the terminology being that employed in connection with screw threads.

The upper end of auger 120 is supported on the outer end of auger arm 115 by being firmly and rigidly welded thereto, as by welding material indicated at 121. The exposed surface of weld 121 is preferably ground to a smooth cove-like exterior in order to avoid recesses, pockets, or other inaccessible places from a cleaning and sanitary standpoint. Auger arm 115, seen in plan view in FIG. 10, may be machined from bar stock. It has a square vertical opening 117 which receives the square driving end 114 of shaft 113, extending downwardly from gear box 75 to which drive motor 76 is attached. Shaft 113 is rotated slowly in a left-hand or counterclockwise direction as viewed from above (rotation time being on the order of one rotation per second). The lower end of the drive opening through arm 115 has a circular counterbore to a desired depth to snugly receive insert button 119 which is preferably of a low-friction plastic bearing material such as nylon. The lower face of 119 may be slightly domed as is indicated to confine the contact of support of the auger arm and its auger to a small circular area. As indicated, these items are supported on the smooth upper face of the closed evaporator tube or freezer 130, closed by a plug as seen best in FIG. 11. The items 113, 119, 130, and 80 preferably all have a common vertical center line or axis as nearly as is commercially practicable to avoid mechanical loss of efficiency resulting from undue eccentricity.

As is evident from the illustrated construction, with shaft 113 closely held in alignment by its bearings (not shown) in gear box 75, and with a fairly close but free sliding fit of the square portion 114 of the drive shaft within the drive opening 117 (FIG. 10) of auger arm 115, the top end of auger 120 is fairly closely guided and is caused to be rotated concentrically around freezer tube 130 and within vessel tube 80. Because of the tremendous forces involved in chipping the frozen ice from the surface of freezer tube 130, the fit between auger arm 115 and shaft portion 114 cannot be depended upon to maintain the lower portion of auger 120 reasonably concentric with tubes 80 and 130 because of the inevitable slight play between the auger arm and its drive shaft when the two are not rigidly welded together, and because of the inherent flexibility of auger 120 itself even when made of stiff round rod. Accordingly, in the preferred embodiment, the lower end of auger 120 is held closely to its desired concentric position by cylinder 124 inserted within the lower portion of vessel cylinder 80 and so dimensioned as to provide only a slight commercially tolerant spacing between auger 120 and guide cylinder or tube 124, on the order of a few thousandths of an inch. It has been found that the height of bearing sleeve 124 is sufficient when it equals one full turn or spiral of the auger. A materially greater height is generally undesirable because it restricts the flow of water around the outside of the auger and within tube 80 to replace the volume of water removed as ice. A plastic of low-friction characteristics in contact with metal, of the character of nylon, has been found suitable for use at 124. It has been found that the wear between the auger and sleeve 124 of the noted type of material is negligible after a long period of continuous heavy-duty use.

By limiting the auger elongation permitted, the close proximity between the smooth and rounded lower end 122 of auger 120 and the upper face of washer-like end-thrust member 125 substantially eliminates the noted tendency, especially when the surrounding temperature is low, of the auger to undergo destructive of noisily loud return snap actions as the ice flakes suddenly loosen.

Member 125 is preferably composed of the same low-friction plastic material as sleeve 124, and is illustrated as formed in one piece therewith, but could obviously be produced as a separate washer-like member. It has been found that a clearance between the lower surface of auger tip 122 and the upper face of member 125 on the order of $\frac{1}{32}$ inch is satisfactory. Substantially smaller clearances, while otherwise useable, are difficult to maintain in commercial production in view of the lengths required of auger 120 and of freezer tube 130 on which it is supported by auger arm 115 and thrust bearing member 119. In this regard, it will be observed that the top end portion 126 of auger 130 (FIGS. 7 and 10) does not align with the trailing side of auger arm 115. Preferably, the lower end of an auger 120 being manufactured is first finished at 122, following which its auger arm 115 is welded to the top spiral of the auger at a location which gives the desired dimension from the undersurface of arm 115 to the lower tip 122, thus leaving a longer or shorter idle upper-end portion 126.

Gear box 75 is preferably provided with a seal (not shown) around shaft 113 to prevent leakage of gear oil or lubricant around auger-drive shaft 113 (FIG. 7). Oil or grease contamination of the water and ice in the ice-making vessel is thereby normally prevented. Independent means is provided, however, at the top of the ice-making vessel to prevent contamination of the vessel contents in the unlikely event of seal leakage. Vessel-closing member 74, 76 is in the flanged-cup form illustrated in cross-section in FIG. 7. Flange 74 is attached to the under side of 75, and drip cup 86 is snugly received within vessel tube 80 to maintain the desired concentricity of shaft 113. Inverted-cup deflector member 88 is secured sealingly and rigidly to shaft 113 and turns therewith. Washer-like pad 89, of felt or other absorbant material, absorbs and retains any small amounts of lubricant which may leak from the gear box. In the event of additional leakage, the lubricant drips from the peripheral depending rim of 88 into the drip cup 86, well outwardly from shaft 113, whence it may drain outwardly through tube 84, located at a lower level than the top of inner circular dam 87 of cup 86.

*Ice-making operation—FIGS. 1 to 10*

The ice-making operation of the preferred embodiment shown in FIGS. 1 to 10 will now be described. For this purpose, it may be assumed that the refrigerating apparatus has just been started into operation (motor compressor 60 and auger 76 operating) and that the water, as admitted from reservoir 17 of FIGS. 3 to 5 through tube 56 and inlet nipple 81 into vessel cylinder 80, stands at water level WL shown in FIG. 7. Until evaporator 30 is chilled sufficiently for ice to begin to form thereon, auger 120 is turned freely by 76 through shaft 113 (in a left-hand or counterclockwise direction) through the water contained in the ice-making vessel.

As the water within 80 becomes chilled about to the freezing point, a coat of ice starts to form on the outside of evaporator 130 except near the top and bottom portions (see sectional view, FIG. 11), which are not contacted by the refrigerant within 130. The tube of ice formed on the surface of 130 applies no particular retarding force to auger 120 until the thickness of the ice equals, and begins to exceed, the clearance between evaporator 130 and the inside surface of auger 120. When this occurs, there is seizure between the affected coils or spirals of auger 120 and the then fully formed layer of ice (not shown) around evaporator 130. Upon such seizure, each seizing coil or coil portion of the slowly turning auger 130 applies a powerful upward force to the encountered ice. There is a corresponding downward force on the auger which is through the auger arm and end-thrust bearing 119 to the center of the upper face of the evaporator tube. There is at least some downward flexing of the auger coils, which progresses until the upward force exerted by the auger is sufficient to shatter and flake away the ice immediately above any auger coil which has seized as described. Commonly, the loosened ice flakes have a thickness up to the clearance between 120 and 130, a vertical dimension up to the vertical center-to-center distance between spirals of the auger, and a width approximating their height or length. Since the described flaking is a form of shattering, the pieces may range in size from comparatively large flakes to small interspersed slivers or granules.

Wherever the ice is flaked away, the concerned part or coil of the auger is relieved of its downward flexing force and thus restores until it again seizingly engages unflaked ice, the freezing and flaking away being a repetitive continuous process. Since the entire supply of water within the ice-making vessel is at about freezing temperature, throughout the ice-making operation the flaked ice has little tendency to be melted by its contact with the surrounding water.

The flaked ice tends to float toward water level WL. Primarily, however, as it collects between the auger coils, it is driven upwardly by the turning auger. This upward drive by auger 120 is greatly assisted by vertical vanes or ribs, such as 127 and 129 spot-welded or otherwise secured to the inner surface of vessel tube 80. They are seen in end view in FIG. 10, with vane 127 also appearing in FIG. 7, with its lower end entering notch 128 in bearing sleeve 124 to prevent the bearing sleeve from rotating within vessel tube 80. Vane 129, which extends upwardly from the top of tube 124 to a point just below the auger arm, is shown only in dotted outline in FIG. 7 since the portion of tube 80 to which it is attached is not located in the section of tube 80 shown in FIG. 7. Any masses of the flaked ice being conveyed by auger 120 is prevented by vanes or ribs 127, 129 from riding idly around the vessel between adjacent auger coils to block the conveying action.

The ice masses carried upwardly by the auger are forced by the auger and by vanes 127, 129 out of the water and into the path of auger arm 115. On each sweep of the auger arm 115 (seen from above in FIG. 10) the encountered ice masses are pushed rotarily by the leading side, which has the rearward slope 116 (FIG. 10) thereon. Slope 116 gives a slight outward pressure to the ice masses rotated by the auger arm. As a consequence, when the auger arm approaches the discharge opening 82 (FIGS. 7, 8, and 10), the outward pressure causes the ice masses being pushed ahead of the auger arm to be thrust with some force out through opening 82. This sideward ejection action, enhanced by the illustrated sloped portion 116 of the auger arm, is somewhat further enhanced by the illustrated location of vane 127 at the trailing edge of the discharge opening 82.

Figures 10, 11, 12, 13:
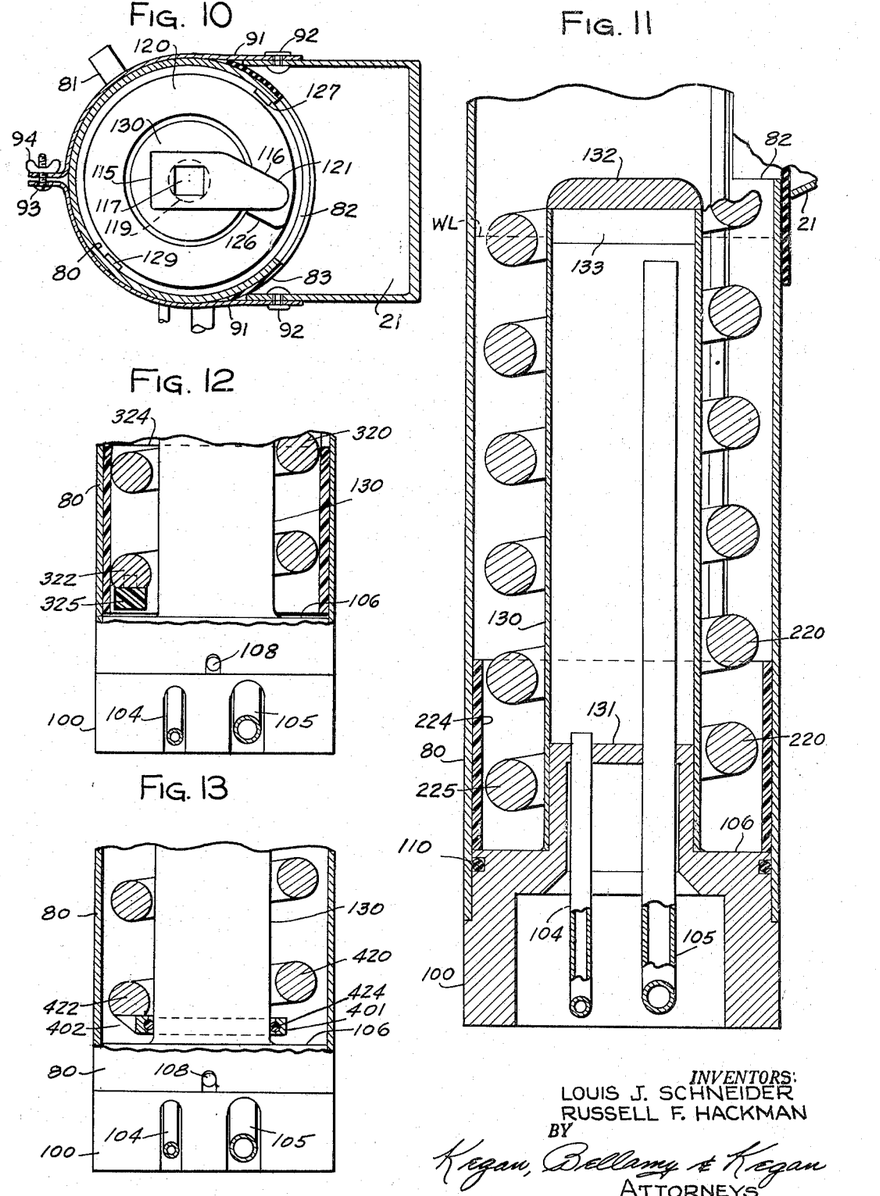
FIG. 10 is a view partly in section, looking down generally along line 10—10 of FIG. 7.
FIG. 11 is a left-side sectional view of a slightly modified form of the structure of FIGS. 6 to 8.
FIGS. 12 and 13 are fragmentary left-side views partly in section of respective additional modifications of the ice-making apparatus.

As succeeding masses of ice are thrust through the opening 82, the masses already pushed therethrough are further thrust by the succeeding masses, causing the ice to accumulate and travel upwardly through chute 21 until the flaked ice begins to spill out of the end of the chute and drop onto or alongside of diverter 22 and into the storage bin.

The rate of travel of the flaked ice up chute 21 is comparatively slow. Accordingly, any excess water adhering to and between the ice flakes being pushed up the chute has ample time to drain therefrom and to return to the water within the ice-making vessel. The discharged ice flakes are accordingly very much drier when they reach the top of the chute than when first pushed into the entrance of the chute. Additionally, chute 21, with the disclosed auger-arm and guide-vane arrangement for forcing ice into it, permits a much higher filling of the storage bin 30 than could be otherwise accomplished.

As the foregoing action continues, fresh water is supplied from reservoir 17 to maintain the level thereof at WL (FIG. 7).

Particularly with a low surrounding temperature, the forces encountered by the auger 120 may become great enough for the auger to elongate (just before a breakaway operation at several of its coils) a substantial fraction of the diameter of the round steel rod from which the auger is formed. Then a violent snapping retraction of the auger may occur which is objectionable from a noise standpoint and may be injurious to the apparatus. A round-rod auger is less liable to this violent return than a more flexible auger, one made of ribbon-like stock for example. However, with the end thrust member 125 in place as shown in FIG. 7, the elongation under ice-removal force of the auger 120 is restricted to the small clearance between the upper face of 125 and auger tip 122. Thereby, the violent snapping retraction of the auger coils otherwise occurring is substantially eliminated. At the same time, the tendency of the lower end of the auger to tip sideward under the described great stresses of ice removal is substantially eliminated by the described bearing sleeve 124 of FIG. 7 within which the lower end of the auger is rather closely confined.

It will be understood, of course, that the spirals are somewhat expanded radially by the radial forces required to effect seizure of a slowly thickening ice layer, and that they retract radially upon the shattering upwardly of the seized ice layer. However, the radial expansion and contraction are small compared to the described axial expansion and contraction because, for example, radial expansion forces affect the coils of the auger singly, whereas the axial expansion forces affect the coils cumulatively. Since the radial expansion and contraction dimensions are small, the radial retraction forces released when shattering or chipping occurs appear not to contribute to noisy action, even under hard-ice cold-surrounding conditions. Besides, the radial forces are balanced around the evaporator, wherefore they tend to cancel from the mechanical standpoint. When they do not, sleeve 124 readily maintains the auger about concentric with the evaporator tube.

When the ice-making structure of FIGS. 1 to 10 is to be cleaned and sterilized, it may be taken apart (preferably with the water supply to reservoir 27 shut off) by disconnecting water tube 56 from nipple 81 of vessel tube 80, and loosening and removing both wing nuts 73 of FIG. 5. When this has been done, the assembly comprising motor and gear-box items 76, 75, with attached member 74 and clamp brackets 78, attached to cup flange 74, may be lifted from vessel tube 80, leaving the auger within the vessel tube because of the slip fit of square portion 114 of shaft 113 with the square opening 117 (FIGS. 7 and 10) in the auger arm. This detachable connection between the drive shaft and the auger is essential to the disclosed cabinet construction, since there is insufficient head room within the cabinet 1 to permit the assembly to be lifted free with the auger attached.

The auger assembly may now be removed through the top of the vessel tube 80. Chute 21 is loosened from tube 80 by removing bolt 93, permitting clamp arms 91 to be raised. Vessel tube 80 may now be lifted from its assembled position to expose the parts within for such cleaning and sterilizing as is desired, following which the parts may be restored to their illustrated assembled position. A locating notch (FIG. 6) in tube 80 receives locating pin 108, and drain tube 84 is received in locating notch 85 in tube 80. The assembly is tightened in place by threading and tightening wing nuts 73 on hold-down rods 72 to clamp the entire ice-making assembly securely to its elevated base plate 48.

The relatively large opening (FIG. 7) through the back wall of bin 30, covered by finish plate 23 (which may be of flexible rubber-like material if desired) permits chute 21 and its attached diverter 22 to be removed for sterilization, if desired, while the ice-making apparatus is disassembled as described.

*Modified auger construction—FIGS. 11 to 13*

In FIG. 11, auger 220 is shown which may be similar to auger 120 shown in FIGS. 7 to 10, except that it is substantially shorter to keep it from striking the exposed face 106 of base member 100, end-thrust member 125 being omitted in FIG. 11. Guide sleeve 224 corresponds to sleeve 124 of FIG. 7. Auger 220 operates quite satisfactorily as described for auger 120, except for a greater tendency to emit comparatively sharp crackling noises as it flakes the ice loose from evaporator 130, but these noises are not too severe nor is the snapping particularly harmful to the apparatus except under low surrounding temperature conditions, in which case the construction illustrated and described in connection with FIG. 7 is greatly to be preferred. However, in certain localities where the surrounding temperature is unlikely to be low, the auger embodiment of FIG. 11 is quite satisfactory.

In FIG. 12, the auger 320 is of a length corresponding generally to that of auger 120 of FIG. 7, and sleeve 324 corresponds to sleeves 124 and 224. Here, undesired elongation of the auger is prevented, as is undesired metal-to-metal contact between auger tip 322 and the upper face of base 100, by low-friction button 325 suitably affixed to the underneath side of the lower tip portion 322 of auger 320, with a small clearance between button 325 and the underlying metal surface 106. The operation is about as described in connection with the auger of FIG. 7, except that button 325 may wear slightly more than annular member 125 of FIG. 7 because of its smaller contact surface.

In FIG. 13, auger 420 is illustrated as of a form rendering unnecessary the employment of a lower bearing sleeve for the auger such as sleeve 124 of FIG. 7. Here, bearing ring 401 is welded as at 402 to the lower tip 422 of auger 420 and carries an internal low-friction bearing ring 424 snugly received in an internal annular groove in 401 and closely surrounding evaporator tube 130. This arrangement has been found to provide side guidance of the auger about as well as sleeve 124, 224, 324, but is somewhat more expensive to produce and shows a somewhat greater tendency to wear because of the reduced area of bearing contact.

It may be noted that members 325 and 424 are preferably of the same low-friction material described for 125 and 124.

Figure 14:
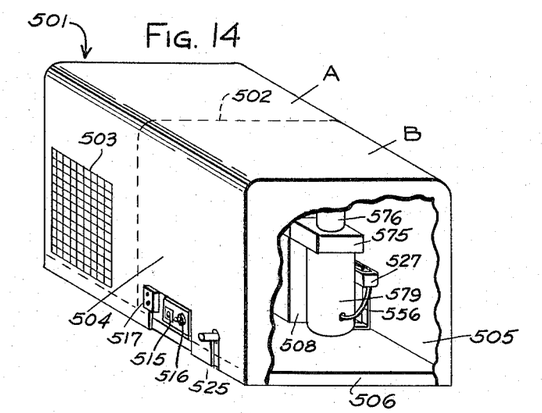
FIG. 14 is an angular view of a non-storage form of the ice-making apparatus.
Figure 15:
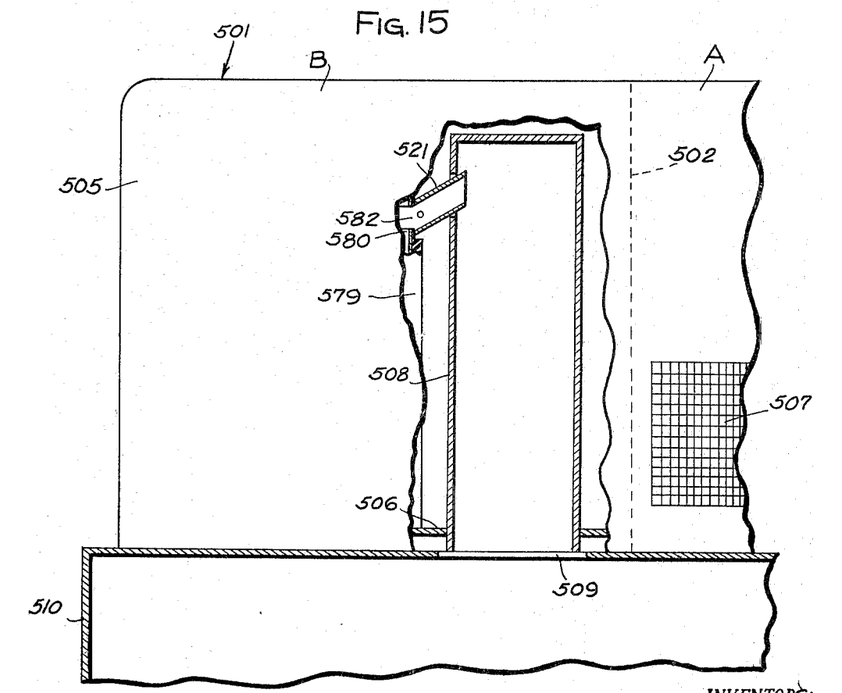
FIG. 15 is a fragmentary view partially in section of the structure of FIG. 14, showing the discharge of ice therefrom into an underlying storage compartment.

*Non-Storage embodiment—FIGS. 14 and 15*

FIGS. 14 and 15 illustrate non-storage apparatus according to the invention. Here, the ice-making apparatus is contained within a removable housing 501, supported on base 506. Dotted line 502 in FIG. 14 may indicate an imaginary division of housing 501 into sections A and B. Section A contains the refrigerating apparatus of the principal embodiment, corresponding to items 60, 62, 63, and 65 of FIG. 5. The air passage for condenser-cooling purposes may be in through grill 503 and out through grill 507.

Section B of housing 501 contains the ice-making apparatus comparable to that of the cabinet embodiment which is supported on base 48, together with a reservoir 527 secured by a bracket to base 506. Tube 556 connects the outlet of 527 into the ice-making vessel, covered with insulating jacket 579, serving the purpose of insulating jacket 79 shown in FIGS. 4 and 5. Items 575 and 576 are a gear box and an auger-drive motor corresponding to 75 and 76 of the cabinet embodiment.

The housing 501 is notched to receive items secured to base 506, comprising water inlet 525, start and reset buttons 515 and 516, and junction box 517. They correspond respectively to items 25, 15, 16, and 17 of the cabinet embodiment.

As shown in FIG. 15, the non-storage embodiment is intended to rest on or above a separate bin such as 510 having an ice-receiving opening such as 509 into which the ice may drop as it is made and expelled by the ice-making apparatus. For this purpose, a vertical drop chute 508 is provided which is open at the lower end and which extends upwardly from base 506. Entrance into the vertical chute 507 is provided by an upwardly inclined chute 521 which is associated with discharge opening 582 of vessel tube 580 as described for the corresponding parts of the cabinet embodiment. Chute 521, unlike chute 21, does not have a diverter 23, but merely permits the ice to drop down chute 508 and accumulate within separate storage bin 510. However, chute 521 has the disclosed upward inclination, as described for chute 21, to permit adhering water to drain from the ice.

Referring further to FIG. 7, the described limiting of axial elongation of auger 120 by the described small clearance between its lower tip portion 122 and the upper face of member 125 does not preclude up and down movement of intermediate portions of the auger according to decreases and increases of vertical stresses incident to the described ice removal. Certain of the coils then undergo further axial expansion and others undergo corresponding axial contraction. These statements clearly apply also to a situation wherein the normal clearance between 122 and 125 is reduced to zero.

Reference is made to our divisional application for Apparatus for Making Flake Ice, Serial No. 43,620, filed July 18, 1960, now Patent No. 3,034,317.

While we have described above the principles of our invention in connection with specific apparatus, it is to be clearly understood that this description is made only by way of example and not as a limitation to the scope of our invention.

We claim:

1. Ice-making apparatus comprising an upright cylindrical vessel for holding water to be made into ice, a closed refrigerated cylinder extending concentrically upwardly within the vessel from the bottom thereof, an ice remover spaced from and surrounding the cylinder, means for suspending the ice remover concentrically atop of the cylinder for a turning movement concentrically therewith, the suspending means including a support member fixed with the ice remover and extending across the radius of the cylinder, turning means for the ice remover located above said vessel and said cylinder and including a turning shaft extending downwardly along the axis of said cylinder into keying engagement with said support member, wherein said support member has a vertical opening within which the lower end portion of said turning shaft terminates, said opening and said end portion each being of a non-circular keying shape with respect to the other and of a size relative to the other to provide a comparatively snug but axially free engagement for turning the ice remover, and wherein said opening extends entirely through said support member, while said shaft extends only part way through the support member, the lower end portion of the opening being counter-bored, an end-thrust and ice-remover supporting bearing stud received within the counter-bored lower end portion of the support member opening and making firm, continuous low-friction axial-support contact with the top surface of said cylinder, the bearing stud having a short cylindrical locating portion snugly received in the said counter-bored postion and having a head portion which provides a support shoulder around the counter-bore and which has a lower end for making low-friction, continuous support contact with the upper end of said cylinder.

2. In an ice-making apparatus comprising an upright cylindrical vessel for containing water to be made into ice, the vessel containing an upright refrigerated ice-making cylinder surrounded by an ice remover which is turnable to remove ice formed around the cylinder, a vane fixed with the vessel, said vane extending radially inwardly of said vessel and extending upwardly therein for a substantial portion of the height of said vessel upwardly outside the ice remover in an out-of-contact relation therewith during normal operation of said apparatus and in a position to engage removed ice carried around between the ice remover and the vessel, one of the items comprising the said one vane and the said ice remover being of a spiral form to raise the last said ice by screw action.

3. In an ice-making apparatus including a tubular evaporator casing having a top wall at the upper end thereof, a liquid vessel surrounding said casing and extending to a level above said top wall to form a liquid chamber around the casing, said vessel including an annular wall spaced radially from the casing and a head on the upper end of said annular wall spaced bove said top wall on the casing, said annular wall having an ice ejection opening therein at the end adjacent said head, ice remover drive means including a shaft extending downwardly through said head, an arm attached to said drive shaft between said top wall and said head and extending laterally of said shaft at a level that intersects said discharge opening, a rotary ice removing device attached to the free end of said arm and surrounding said casing to remove frozen liquid therefrom as the shaft is rotated; the improvement which comprises a rib extending upwardly with said vessel for a substantial portion of the height of said vessel, said rib being fixed with said vessel and out-of-contact with said ice removing device during normal operation of said apparatus, said rib being supported on and extending inwardly of said annular wall into said chamber and adjacent the side of the ejection opening last encountered by said arm in a rotation to aid in the ejection of ice masses through said opening, one of the items comprising the said rib and the said ice removing device being of a spiral form to raise by screw action ice formed on and removed from said evaporator casing.

4. In an apparatus for freezing liquids comprising, an evaporator casing closed at one end, a head member at the other end of the evaporator casing, said head member having an outer peripheral wall spaced radially outwardly from the evaporator casing, an outer shell member surrunding said peripheral wall, one of said members having a groove formed in the registering faces and an O-ring in said groove for sealing the interface between said shell and head members, said shell extending in spaced relation to said evaporator casing to form an outer chamber therebetween, refrigerant inlet and return passages extending through said head and communicating with said evaporator casing to pass refrigerant thereto for chilling the walls of the evaporator casing, passage means communicating with said outer chamber for supplying liquid thereto, and means including an ice removing device disposed in said outer chamber and surrounding said evaporator casing for removing frozen liquid therefrom; the improvement which comprises at least one vane fixed with said outer shell member and extending upwardly outside said ice removing device in and out-of-contact relation therewith during normal operation of said apparatus and in a position to engage removed ice carried around between said ice removing device and said outer shell member one of the items comprising the said one vane and the said ice remover being of spiral form to raise the last said ice by screw action.

5. In an ice-making machine comprising, an inner drum shaped evaporator casing closed at one end, an outer casing extending around the inner casing in spaced relation thereto, and an end wall extending between the inner and outer casings adjacent the other end of said casing to form a liquid chamber therebetween, an ice removing device extending around said inner casing, said ice removing device defining a generally annular cage open at one end thereof to enable axial insertion and removal of the ice removing device from around the inner casing and having means at the other end overlying said closed end of the inner casing and adapted for connection to a drive means, an annular bearing between said open end of said ice removing device and one of said casings and dimensioned to slidably and rotatably engage said one of said casings, a drive means coupled to said other end of said ice removing device for forceably rotating the same relative to said inner casing, means for supplying liquid to the chamber between said inner and outer casings, and means for refrigerating the walls of said inner casing to freeze a layer of liquid thereon; the improvement which comprises at least one vane fixed with said outer casing and extending upwardly outside said ice-removing device in an out-of-contact relation therewith during normal operation of said machine and in a position to engage removed ice carried around between said ice-removing device and said outer casing, one of the items comprising the said one vane and the said ice-removing device being of a spiral form to raise the last said ice by screw action.

6. In an ice-making apparatus comprising an upright cylindrical ice-making vessel for containing water to be made into ice, a refrigerated ice-making cylinder extending concentrically upwardly within the vessel from the bottom thereof and surrounded by an ice-remover, and means for turning the ice-remover to remove and raise ice formed around the ice-making cylinder, said ice-remover terminating short of the bottom of the vessel; the improvement which comprises low friction bearing means located between the lower end of the ice-remover and the cylindrical vessel at the bottom and at the lower wall portions of said vessel, said bearing means consisting essentially of an annular sleeve L-shaped in cross-section and contiguous to said bottom and said lower wall portion of said vessel, said bearing means being effective to limit both axial elongation and radial movement of said ice-remover and to prevent abrasion of said bottom and said lower wall portion of said vessel by said ice-remover.

7. An ice-making apparatus comprising an upright cylindrical vessel for containing water to be made into ice, refrigerating means for forming ice within said vessel, an ice-remover within said vessel for breaking loose the ice within said vessel and raising said ice to the top of the vessel, an ice discharge port in said vessel adjacent the top thereof, an ice-remover arm extending radially at the top of said ice-remover, means for rotating said arm, said arm including means for sweeping past said discharge port in response to said rotation of the arm to eject said raised ice out through said port, and a rib member extending inwardly from said vessel adjacent the side edge of said port last passed by said ice-remover arm on its rotation thereof, said member being in close proximity to the outer surface of said ice remover but out of contact therewith in normal operation, said member retarding that ice which tends to be swept past said port without being discharged therethrough, said member extending upwardly within said vessel for a substantial portion of the height of said vessel.

8. An ice-making apparatus as recited in claim 7 and further comprising an inclined chute extending upwardly from said port, and a storage bin in communication with the uppermost end of said chute.

9. In an ice-making apparatus comprising an upright first cylindrical vessel for containing water to be made into ice, a refrigerated second cylindrical vessel extending concentrically upwardly within the first cylindrical vessel from the bottom thereof and surrounded by an ice-remover, means extending downwardly to the ice-remover for turning it to remove and raise ice formed around the second vessel, and means adjacent the turning means for maintaining the upper end of the ice-remover substantially concentric with said vessels to avoid frictional contact of the ice-remover with either vessel; the improvement which comprises a short, sleeve-like annular bearing of low friction material distinct from but contiguous with said first cylindrical vessel and restricted to abut only a lower wall portion thereof, said bearing being fixed between the lower portion of the ice-remover and the said lower wall portion of said first cylindrical vessel and being telescopingly related with said lower portion only of said ice remover to maintain the lower portion of the ice-remover out-of-contact with said first cylindrical vessel.

10. An ice-producing apparatus comprising: an upright vessel, a drum-shaped evaporator casing extending co-axially into the vessel and closed at the upper end thereof, means for refrigerating the walls of the evaporator casing to freeze a layer of liquid thereon, an ice remover extending into the chamber between said evaporator casing and said vessel and having a drive member at the upper end thereof and overlying said closed upper end of said evaporator casing, drive means mounted above said vessel and including a shaft extending concentrically of said evaporator casing, bearing means interposed between said drive member and said closed upper end of said evaporator casing, whereby said upper end of said evaporator casing constitutes the sole upper support of said ice-remover, and keying means providing axially-free engagement operatively connecting said drive means to said drive member for rotating the latter while permitting the shaft to be raised upwardly out of engagement with the ice-removing device when said drive means is removed; whereby less headroom is required for assembling and removing the drive means and ice-removing device than if the two were assemblable and removable only together.

11. In an ice making apparatus comprising an upright first cylindrical vessel for containing water to be made into ice, a refrigerated second cylindrical vessel extending concentrically upward within the first vessel from the bottom thereof, and surrounded by an ice remover, means extending downwardly to the ice remover for turning it to remove and raise ice formed around the second vessel, and means adjacent the turning means for maintaining the upper end of the ice remover substantially concentric with said vessels to avoid frictional contact of the ice remover with either vessel, annular bearing means restricted to a region adjacent the lower portion of the ice remover and disposed between said lower portion of the ice remover and the surface of one of said vessels to maintain said lower portion of the ice remover substantially concentric with the vessels, the improvement wherein said annular bearing means comprises a circular sleeve of low friction material telescopingly related with the lower end of said ice remover and mounted against a surface of one of the vessels, said sleeve having a groove therein extending parallel to the axis of said sleeve, and further comprising keying means consisting essentially of an elongated radially inwardly extending vane attached to the inside surface of one of said vessels and extending parallel to the axis thereof, said vane being received in said groove to preclude rotation of said sleeve about its axis.

12. In an ice-making apparatus comprising an upright first cylindrical vessel for containing water to be made into ice, a refrigerated second cylindrical vessel extending concentrically upwardly within the first vessel from the bottom thereof and surrounded by an ice remover, means extending downwardly to the ice remover for turning it to remove and raise ice formed around the second vessel, and means adjacent the turning means for maintaining the upper end of the ice remover substantially concentric with said vessels to avoid frictional contact of the ice remover with either vessel, annular bearing means restricted to a region adjacent the lower portion of the ice remover and disposed between said lower portions of the ice remover and the surface of one of said vessels to maintain said lower portion of the ice remover substantially concentric with the vessels, the improvement wherein said annular bearing means comprises a circular sleeve of low friction material telescopingly related with the lower end of said ice remover and mounted against a surface of said first cylindrical vessel.

13. In an ice-making apparatus comprising an upright first cylindrical vessel for containing water to be made into ice, a refrigerated second cylindrical vessel extending concentrically upwardly within the first vessel from the bottom thereof and surrounded by an ice remover, means extending downwardly to the ice remover for turning it to remove and raise ice formed around the second vessel, and means adjacent the turning means for maintaining the upper end of the ice remover substantially concentric with said vessels to avoid frictional contact of the ice remover with either vessel, annular bearing means restricted to a region adjacent the lower portion of the ice remover and disposed between said lower portion of the ice remover and the surface of one of said vessels to maintain said lower portion of the ice remover substantially concentric with the vessels, the improvement wherein said bearing means comprises an annulus of a low-friction non-metallic material carried by the lower end of said ice remover for guide-bearing contact with a bottom surface of one of the said vessels.

14. In an ice-making apparatus comprising an upright first cylindrical vessel for containing water to be made into ice, a refrigerated second cylindrical vessel extending concentrically upwardly within the first vessel from the bottom thereof and surrounded by an ice remover, means extending downwardly to the ice remover for turning it to remove and raise ice formed around the second vessel, and means adjacent the turning means for maintaining the upper end of the ice remover substantially concentric with said vessels to avoid frictional contact of the ice remover with either vessel, the improvement which comprises annular bearing means between the lower portion of the ice remover and the surface of one of said vessels to maintain the lower portion of the ice remover substantially concentric with the vessels, said bearing means comprising an annulus of low friction material carried by the lower end of said ice remover for guide-bearing contact with a surface of one of the said vessels, a bearing-retaining ring disposed below the lower end of said ice remover and fixed concentrically therewith, said ring having an internal groove containing the said annulus for contact with the outside surface of said second vessel.

15. Ice-making apparatus comprising an upright cylindrical vessel for holding water to be made into ice, a closed refrigerated cylinder extending concentrically upwardly within the vessel from the bottom thereof, an ice remover comprising a rotary ice-removing device having an ice engaging surface spaced from and surrounding the cylinder, a support member fixed with the ice remover and extending across the radius of the cylinder, low friction plastic bearing means carried by said ice remover and presenting a bearing surface to abut and rest upon said cylinder on a top wall thereof and to support said ice remover atop of said cylinder for turning concentrically therewith, said top wall of said refrigerated cylinder comprising the sole upper support means for said ice remover, and turning means for the ice remover located above said vessel and said cylinder and including a turning shaft extending downwardly along the axis of said cylinder into keying engagement with said support member, wherein said support member has a vertical opening within which the lower end portion of said turning shaft terminates, said opening and said end portion each being of a non-circular keying shape with respect to the other and of a size relative to the other to provide a comparatively snug but axially free engagement for turning the ice remover.

16. In an ice-making apparatus comprising an upright cylindrical vessel for containing water to be made into ice, the vessel containing an upright refrigerated ice-making cylinder surrounded by an ice remover which is turnable to remove ice formed around the cylinder, at least one vane fixed with the vessel, and extending upwardly outside the ice remover in an out-of-contact relation therewith during normal operation of said apparatus and in a position to engage removed ice carried around between the ice remover and the vessel, one of the items comprising the said one vane and the said ice remover being of a spiral form to raise the last said ice by screw action, said cylinder terminating below the top of the vessel, said vessel having an ice-ejection opening in the side thereof above the top of the cylinder, the said ice remover being surmounted by a transverse arm rotatable with the ice remover on a level with the ejection opening to eject raised ice therethrough, one vane passing upwardly along the side of the ejection opening last encountered by said arm in a rotation to aid in the ejection of ice masses through the opening, and at least one other vane terminating below the level of said arm to avoid interference with the rotation of ice masses by said arm toward the ejection opening, said other vane being in an out-of-contact relation with said ice remover during normal operation of said apparatus.

References Cited by the Examiner

UNITED STATES PATENTS

| | | | |
|---|---|---|---|
| 256,076 | 4/1882 | Colby | 62—303 |
| 824,075 | 6/1906 | Gerner | 62—342 |
| 896,551 | 8/1908 | Jurgens | 62—68 |
| 1,345,746 | 7/1920 | Brown | 62—132 |
| 1,798,725 | 3/1931 | Christensen | 62—342 |
| 1,841,616 | 1/1932 | Lipman | 62—298 |
| 1,882,752 | 10/1932 | Blood | 62—298 |
| 1,951,412 | 3/1934 | Hill | 62—69 |
| 1,954,518 | 4/1934 | Downer | 62—354 |
| 2,031,599 | 2/1936 | Gudmundsen | 62—132 |
| 2,145,331 | 1/1939 | Arensberg | 62—343 |
| 2,199,038 | 4/1940 | Brix-Hansen | 62—354 |
| 2,402,931 | 6/1946 | Thomas | 62—347 |
| 2,484,017 | 10/1949 | Copeman | 62—344 |
| 2,490,324 | 12/1949 | Rigby | 62—354 |
| 2,496,155 | 1/1950 | Fulkerson | 62—298 |
| 2,515,722 | 7/1950 | Maranz | 62—343 |
| 2,597,515 | 5/1952 | Nitsch | 62—354 |
| 2,599,077 | 6/1952 | Sturgis | 15—104.9 |
| 2,651,186 | 9/1953 | Murphy | 62—342 |
| 2,656,686 | 10/1953 | Bayston | 62—344 |
| 2,666,304 | 1/1954 | Ahrel | 62—347 |
| 2,690,061 | 9/1954 | Markley | 62—303 |
| 2,722,110 | 11/1955 | Denzer | 62—344 |
| 2,740,264 | 4/1956 | Thompson | 62—343 |
| 2,753,694 | 7/1956 | Trow | 62—320 |
| 2,758,451 | 8/1956 | Lauterbach | 62—354 |
| 2,782,609 | 2/1957 | Galin | 62—344 |
| 2,877,632 | 3/1959 | Chaplik | 62—320 |
| 2,962,878 | 12/1960 | Keller | 62—354 |

FOREIGN PATENTS 220,263   2/1959   Australia.

ROBERT A. O'LEARY, *Primary Examiner.*

R. D. SMITH, N. YUDKOFF, G. A. EPPNER, L. G. WISE, W. E. WAYNER, *Assistant Examiners.*